United States Patent
Jones et al.

(10) Patent No.: US 6,531,985 B1
(45) Date of Patent: Mar. 11, 2003

(54) INTEGRATED LAPTOP ANTENNA USING TWO OR MORE ANTENNAS

(75) Inventors: Jeffrey L. Jones, Orem, UT (US); Dirk Ostermiller, Salt Lake City, UT (US); Sy Prestwich, Riverton, UT (US); David Andrus, Provo, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/638,538

(22) Filed: Aug. 14, 2000

(51) Int. Cl.[7] .................................................. H01Q 1/24
(52) U.S. Cl. .............................. 343/702; 343/700 MS; 343/873; 455/575; 455/90; 455/347
(58) Field of Search .......................... 343/700 MS, 702, 343/872, 853; 455/90, 575, 347; H01Q 1/24

(56) References Cited

U.S. PATENT DOCUMENTS

| | | | | |
|---|---|---|---|---|
| 5,373,300 A | * | 12/1994 | Jenness et al. ............... | 343/702 |
| 5,677,698 A | * | 10/1997 | Snowdon ..................... | 343/702 |
| 5,966,098 A | * | 10/1999 | Qi et al. ...................... | 343/702 |
| 5,977,916 A | * | 11/1999 | Vannatta et al. ............. | 343/702 |
| 6,104,349 A | * | 8/2000 | Cohen ......................... | 343/702 |
| 6,115,762 A | * | 9/2000 | Bell et al. .................... | 343/702 |
| 6,339,400 B1 | * | 1/2002 | Flint et al. ................... | 343/702 |

* cited by examiner

*Primary Examiner*—Michael C. Wimer
(74) *Attorney, Agent, or Firm*—Workman, Nydegger & Seeley

(57) ABSTRACT

An integrated diversity antenna solution is presented that positions multiple antennas within the digital device case. The integrated diversity antenna solution works equally well with diversity radios, such as 802.11, and non-diversity radios, such as Bluetooth. The non-diversity radios are supported via a power splitter attached to the antennas that give the necessary directional coverage. The integrated antenna array solves the main problem associated with wireless communication on laptop computers, specifically, that laptops perturb the radiation pattern because of the influence that laptop components have on standard antennas and the presence of interfering objects, most notably the laptop user, in the surrounding environment.

20 Claims, 5 Drawing Sheets

INTEGRATED LAPTOP ANTENNA USING TWO OR MORE ANTENNAS

BACKGROUND OF THE INVENTION

1. The Field of the Invention

The present invention relates generally to antenna structures coupled to mobile electronic devices. More specifically, the present invention concerns integrated antennas for portable computers.

2. The Prior State of the Art

Various communication systems are used to allow computers to communicate and exchange data and other types of information. For example, various networks, including Local Area Networks (LAN), Internet, Ethernet and conventional telephone networks, often link computers. These known communication systems, however, usually require the computer to be physically connected to telephone lines, modems or specialized wiring. In some locations, however, it is difficult if not impossible to be physically connected to the communication system. Additionally, these known systems generally cannot be used if the user is traveling or moving to different locations, as is typically the case with a laptop computer.

It is also known to use wireless or cellular telephone systems to connect laptop computers to a communication system. One such application is WLAN, part of the latest technology craze attempting to integrate wireless communication onto portable electronic devices. Another particularly effective application allowing laptop computers to communicate are cellular telephone systems, because the computer does not have to be connected to an existing telephone line. In addition, cellular telephone systems are very useful in connection with portable computers because the cellular communication circuitry can be miniaturized and provided as a component of the computer.

Both of these wireless systems often require specialized antennas. Antenna structures, predominantly used for communication, efficiently transmit and receive electromagnetic energy in the form of radio waves. Antenna structures are used whenever it is impractical, or impossible to use a physical connection, such as a transmission line or waveguide. In order to get the best performance out of the wireless antenna, the antenna must not be obstructed by anything within its path of radiation.

Antenna design attempts to achieve good impedance matching to the feeding transmission line so as to maximize the available power for radiation. Often the power levels are limited by transmission standards. For example "Bluetooth" wireless technology is a de facto standard, as well as a specification for small-form factor, low-cost, short-range radio links between laptops, phones, and other portable digital devices. One of the present Bluetooth specifications is to limit the transmission range to around 10meters. Bluetooth limits the transmission range by reducing the transmit power to the antenna, thus in order to conform with the Bluetooth standard the maximum available transmit power supplied to the antenna for radiation. Thus, while the antenna is designed to distribute the radiation optimally, it has a limited transmission range due to the supplied transmit power.

Antenna design also attempts to achieve the best compromise between the various constraints imposed on the desired radiation pattern. Optimization of the radiation pattern may include maximizing the radiation in one direction and suppressing it in others. If a specific desired radiation pattern is difficult or impossible to obtain using a single antenna, antenna engineers will often resort to designing arrays of simple antennas. Adjustment of the amplitude and phase of the feed voltages to the various elements in the array, as well as the geometrical arrangement of these elements, often achieves the desired radiation characteristics. Unfortunately, antenna array design is complicated by the mutual interaction between the various elements in the array and the operating environment of the array.

One example of a more difficult operating environment with multiple mutual interacting components that affect the desired radiation patterns is a laptop computer. Different brands of laptop computers use different shielding components for electromagnetic interference (EMI) that affect the antennas quite dramatically from one vendor to another. For example, some laptop computers use conductive materials or fillers, such as exotic conductive plastic material, that interfere with fully integrated antenna arrays in the laptop cases or housing bodies. Of course, the laptop display screen also presents a difficult shielding problem of the radiation pattern depending on where the antenna is located. Furthermore, a user is generally positioned in front of the laptop computer blocking a portion of the receiving area and obstructing the desired radiation pattern. Obstruction by the user is especially important with a low power wireless signal, such as Bluetooth, where signals are easy to block and absorb the radiation pattern.

Additionally, the present marketplace severely restricts the placement of integrated antenna structures on laptop computers due to performance, aesthetic, and reliability concerns. Most notable is the reluctance to place an extended integrated antenna on top of the laptop display screen, where the antenna would be virtually unobstructed out and away from everything. It is believed that this reluctance is due to concerns that the antenna structure would interfere with the LCD display. Another concern is that extended antenna structures are often bent, broken, knocked out of alignment or otherwise damaged. It is known that the repair and replacement of integrated antennas is difficult and costly. In fact, the entire attached display screen assembly is often removed and replaced instead of attempting to repair a portion of the integrated antenna or support structure. Thus, repair or replacement of the integrated antenna on top of the display screen is expensive and time consuming. As previously mentioned, even cellular systems require specialized antennas. Antennas used with cellular communication systems generally include a number of antenna elements, each including a radiating element, which is equal in length to some fraction of the wavelength to be transmitted or received. In order to increase the efficiency of communication, these known antennas must include elements that are separated by a minimum distance and these elements are preferably orientated normal to each other to provide the necessary separation and spatial diversity.

Conventional antennas used to connect a computer to a wireless communication system or cellular telephone is typically placed externally of the computer because of the noise, interference, obstruction and shielding caused by the various components of the computer. In particular, conventional antennas do not function correctly if they are obstructed or shielded by the housing or other structures of the computer.

Conventional antennas are also generally rigid and they protrude a relatively long distance from the body of the computer. These protruding antennas are often large, unwieldy, aesthetically unpleasing and they make the computer difficult to move and transport. In addition, these antennas are often bent, broken, knocked out of alignment or otherwise damaged because they can easily catch or strike foreign objects such as people, walls, doors, etc. Further, these known antennas require a large support structure to secure the antenna to the housing of the computer and this support structure requires a considerable amount of space inside the body of the computer. This space is very valuable, especially in small, portable computers. Additionally, the support structure is often damaged when the antenna is accidentally moved.

It is known that the repair and replacement of conventional antennas and the associated support structure is difficult and costly. In fact, the entire antenna assembly is often removed and replaced instead of attempting to repair a portion of the antenna or support structure. Thus, the repair and replacement of the antenna and/or antenna support structure is expensive and time consuming.

In order to alleviate these problems, known antennas are often removed before the computer is moved or transported. Additionally, known antennas must often be removed before the computer can be inserted into its carrying case. Disadvantageously, this requires additional time and resources to remove and reattach the antenna each time the computer is moved. Additionally, the antenna is often misplaced, lost or damaged when it is detached from the computer. Further, because the user often does not want to take the time and effort to remove the antenna, the computer is moved with the antenna still attached to the computer and this frequently results in the antenna being damaged or broken.

It is known to use a telescoping antenna in an attempt to minimize these problems. For example, U.S. Pat. No. 5,684, 672 issued to Karidis, et al. discloses a laptop computer with an integrated multi-mode antenna. The telescoping antenna is integrated into the cover or display portion of the laptop and it outwardly extends from the display portion for use. The telescoping antenna is then retracted into the display portion when it is not in use. A coaxial cable connects the antenna to the base of the computer. In particular, the coaxial cable connects the antenna to a radio frequency (RF) adaptor card inserted into a Personal Computer Memory Card International Adapter (PCMCIA) slot in the base of the computer. Disadvantageously, the coaxial cable or connector disclosed in the Karidis patent protrudes outwardly from the base of the computer and the user must manually extend and retract the antenna. Additionally, it is well known that an antenna should usually be placed in a vertical position to obtain the optimum signal strength. This is because the antenna is most often located just above a conducting horizontal plane such as a metal desktop which acts as a reflecting ground plane that attenuates horizontal components of the electromagnetic wave. However, because the antenna disclosed in the Karidis patent is attached to the display portion of the computer and the antenna is positioned parallel to the display screen, the display screen must be vertically positioned in order for the antenna to obtain the best possible signal. The vertical positioning of the screen, however, may not be the preferred viewing angle of the screen for the computer user. Further, this and other conventional antennas have limited connectivity when the display screen is in the closed position because the antenna extends in a horizontal plane and the housing of the computer may obstruct or shield the antenna.

It is also known to connect an antenna directly to a PCMCIA card. When this type of card is inserted into the PCMCIA slot in the body of the computer, the antenna extends outwardly from the body of the computer. The PCMCIA card and the computer itself, however, are easily damaged by accidental contact with the outwardly extending antenna. Thus, users of PCMCIA cards with antennas must be extremely careful when using the computer in order to avoid damage to the card and/or computer. Additionally, these PCMCIA cards with antennas generally must be removed from the PCMCIA slot in the computer whenever it is desired to store or move the computer. This requires additional time and effort by the user, and the PCMCIA card and antenna may be lost, damaged or misplaced by the user when it is not connected to the computer.

In addition, the PCMCIA card with the attached antenna often receives a degraded or impaired signal because the antenna is frequently obstructed by the computer housing and/or shadowed by the ground plane of the display. Further, the antennas of these types of PCMCIA cards typically have a core that is very brittle and it is easily broken. If the core is broken, the PCMCIA card assembly or the antenna must be repaired or replaced.

Presently, integrated antenna diversity solutions are not found. Since two of the more popular wireless systems, Bluetooth and Home RF, are often implemented without antenna diversity; current solutions for these applications normally often use only a single antenna. These antenna solutions do not have adequate radiation coverage considering the operating environment of most digital devices. A single antenna may also be partially blocked by the operator or an object that is between the antenna and its intended point of communication. Poor coverage, mechanical reliability, extra PC cards, aesthetics, blockage of a single antenna due to an intervening object or multipath are all problems with these non-diversity solutions.

SUMMARY OF THE INVENTION

The present invention has been developed in response to the current state of the art, and in particular, in response to these and other problems and needs that have not been fully or completely solved by currently available antennas for portable digital devices. Thus, it is an overall object of the present invention to provide antennas that generate a radiation pattern particularly useful in reducing the noise, interference, obstruction and shielding caused by the user and various components of portable digital devices. More specifically, the present invention includes antennas that without protruding from the laptop are not obstructed or shielded by the housing or other structures of a laptop computer. Additionally, one advantage of the present invention is that it provides a diversity-like antenna solution for radios that do not support diversity, which are coupled to a portable digital device. While primarily intended for use with radios that do not support diversity, the present invention may also be used with diversity radios as well.

Accordingly, one advantage of the present invention is an integrated antenna system for a portable computer. The antenna system advantageously provides wireless or radio frequency (RF) communication with other networks or communication systems to allow data and other information to be shared or exchanged.

Another advantage of the present invention is a diversity antenna structure that accounts for the disturbance of the radiation pattern by the laptop and the surrounding environment. A diversity antenna structure may be connected to a diversity radio, such as those used in IEEE 802.11 systems, that decide which of the antennas is receiving the strongest signal, and thereby ensure the best possible link performance. Non-diversity radios, such as those used in the Bluetooth systems, are also able to use the diversity antenna structure of the present invention via a power divider, which re-characterizes the diversity antenna as the single antenna expected by the non-diversity radio. More specifically, the present invention supplies an integrated diversity antenna solution that may also be used with non-diversity based wireless systems.

Yet another advantage of the present invention is the mechanical reliability, omnidirectional radiation pattern coverage, and aesthetically unobtrusive nature of the integrated wireless system. The integrated wireless system comprises a mini PCI card or integrated printed circuit board (PCB) with a radio transceiver, power divider, and preamplifier. The system further comprises at least two antennas connected to the PCI card or PCB via mini-coaxial cables. The various electrical couplings between the mini PCI card and at least two antennas can be electrically isolated to improve the signal strength and minimize signal blockage due to the presence of an intervening object.

In a preferred embodiment of the present invention, the apparatus allows wireless communication between a portable computer and a communications network to be established. The apparatus includes a portable computer with a base unit having housing with an upper surface, a lower surface and side walls. The portable computer also includes a display unit, which is attached to the base unit and the portable computer is movable into an open position and a closed position. At least two antennas are enclosed within the side walls of the housing on the base unit of the portable computer. The at least two antennas are configured to transceive diversity and non-diversity wireless communications. Desirably, the at least two antennas are surface mounted antennas, such as, but not limited to, patch antennas that produce a radiation pattern that does not interfere with the radiation pattern of the partner antennas. In the case of a dual antenna structure each antenna would produce a kidney or cardioid shaped radiation coverage and tend to fill the space from the middle of the portable computer outward. Alternatively, the at least two antennas may be overmolded surface mounted antennas placed in the seam of the housing such that the surface of the overmolded antennas are flush with the upper surface and lower surface of the housing along the side walls of the housing. This configuration exposes the at least two antennas to the exterior, thereby reducing the interference, without causing the antennas to protrude from the housing and subject them to undo risk of damage. Both of these configurations increase the reliability of apparatus by removing any moving breakable parts normally associated with antennas. The antennas are operable regardless of the position of the display unit attached to the base unit.

The apparatus also includes a power divider feed structure connected to orthogonally configured antennas via micro-coax cable. Desirably, the power divider feed structure is configured to automatically feed the at least two antennas to produce an omnidirectional radiation coverage pattern, regardless of attached radio. Thus if the portable computer is using a non-diversity radio, such as the radio used in a Bluetooth system, the apparatus utilizes multiple antennas by feeding the radio from the power divider feed structure. But if a diversity radio, such as those used in the IEEE 802.11 RF systems, is used then the apparatus would decide which of the antennas is receiving the strongest RF signal to ensure the high RF link performance. An exemplary power feed structure includes a Wilkinson power divider integrated onto a printed circuit board (PCB). Alternatively, the apparatus can utilize a branch-line quadrature hybrid power divider.

In another preferred embodiment, the present invention includes a portable computer having an open position and a closed position. The portable computer includes a base unit with an upper surface, a lower surface and at least two side walls; at least four orthogonally located patch antennas are connected to the base unit and configured to establish wireless communication between the portable computer and a wireless communication system; and a power divider feed structure is configured to transceive signals with the antennas. The antennas are located in the recess of the seam of the base unit, preferably along the side walls. This configuration allows for spherical radiation coverage regardless of the position of the computer, but also results in a power loss of 6 dB instead of the 3 dB loss observed from a dual patch antenna configuration. Additional interference circuitry is included in the apparatus to coordinate reception from each antenna, since the patch antenna patterns would not be totally orthogonal the signals from the antennas might sum together at an intended destination to form constructive and destructive interference in certain directions.

The present invention, in yet another preferred embodiment, is an antenna system for use with a portable computer having a base unit with a recess sized and configured to receive the antenna system. The antennas used within the antenna system include a radiating element, dielectric material, and a ground plane. The radiating element and ground plane of each antenna are electrically connected via micro-coax cable to a connector of the power divider configured to attach multiple antennas to a radio on a portable computer. The radio may be a wireless or RF radio, integrated into the portable computer. The antenna system is positioned within the seam in the molding on the base unit. The radiating element of the antenna may include a plurality of elongated members positioned proximate to each other. A dielectric material separates these elongated members, but the members are spaced close enough to create a monopole or dipole antenna.

Advantageously, the antenna system of the present invention is a small, compact antenna array that does not protrude from the housing of the computer. Accordingly, the antenna system has little effect on existing portable computer designs and it requires only a small space inside the computer housing. In this location the antennas are not subject to the same exposure risks encountered by extended antenna structures. This significantly decreases design and manufacturing costs while increasing the reliability of the antenna system. The diversity of using two patch antennas, one on each side, of the digital device creates two hemispherical radiation patterns with a minimally sized null area between the antennas. The present invention can connect the two antennas back to a non-diversity transceiver through a power-combiner so that the overall structure appears as a single antenna. This feature allows the antenna structure flexibility to be integrated right into the clamshell housing on the laptop for easier manufacture because the antenna structure can be used with both types of wireless radios. Furthermore, the user would not be aware of where the digital device obtained its wireless conductivity.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
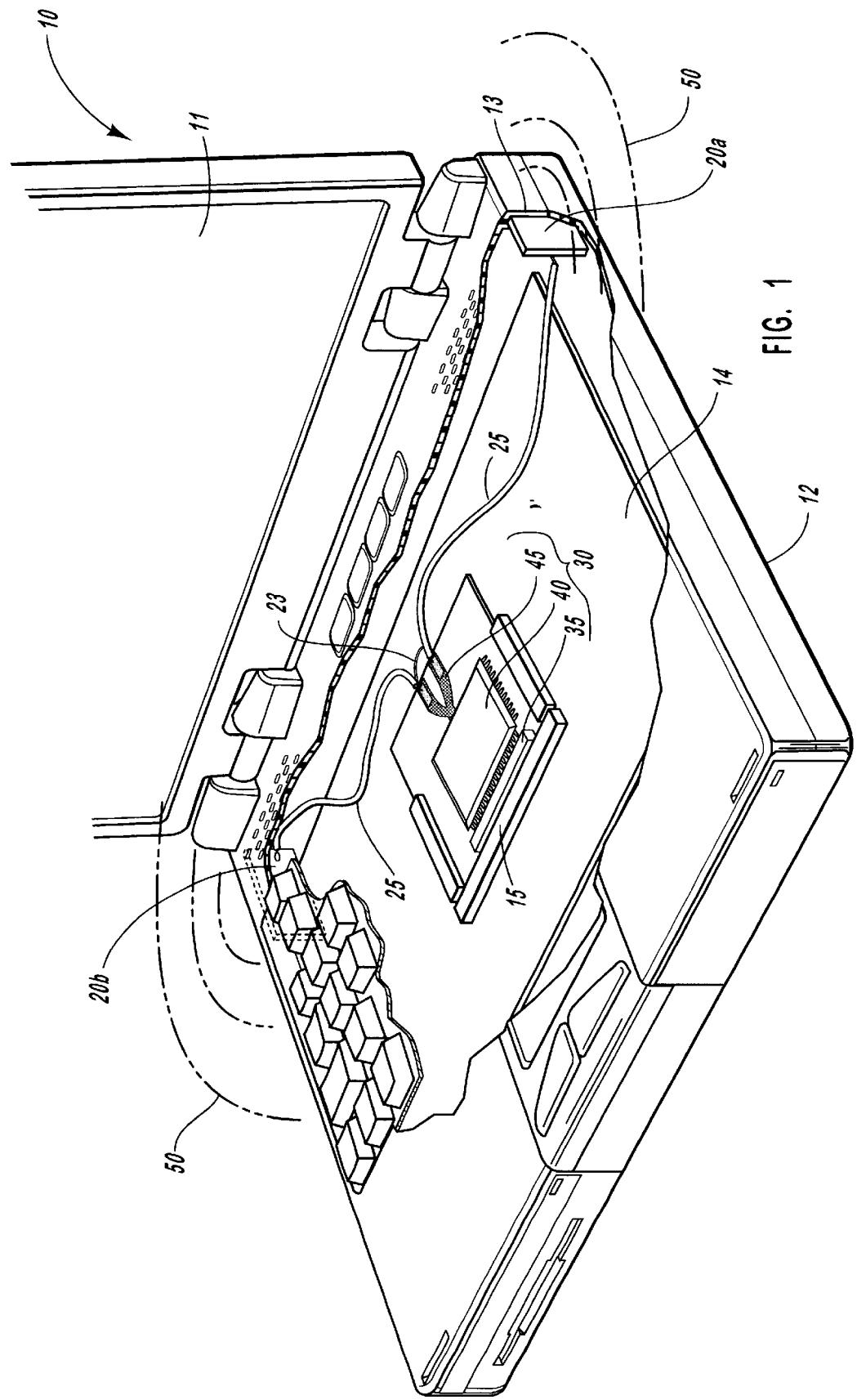
FIG. 1 illustrates an exemplary laptop system that provides a suitable operating environment for the present invention.

FIG. 1 illustrates an exemplary computer laptop system configured for wireless communication. Laptop computer 10 comprising base unit 12 having housing 13 with an upper surface, a lower surface and side walls. The portable laptop computer 10 also includes display unit 11, which is attached to the base unit 12. Laptop computer 10 is movable into an open position and a closed position. At least two antennas 20 are enclosed within the side walls of housing 13 on the base unit 12 of laptop computer 10. Laptop computer 10 is configured with antennas 20a and 20b connected to a wireless PCI card 30 via micro-coaxial cables 25. Tracer 23 ensures consistency at the output of the power dividers of the signal to be transmitted. Wireless PCI card 30 comprises power divider 45, preamplifier 40, and wireless radio 35. The wireless PCI card 30 may also contain an interface for external interaction with antennas 20 via software or hardware. Thereby enabling a user to upgrade the wireless radio and underlying software without needing to replace the integrated antennas 20.

Antennas 20 can be integrated within the base of the laptop and connected via micro-coaxial cable 25 to the radio 35 on PCI card 30. Radiation patterns 50 demonstrate the cardioid or kidney shaped hemispherical radiation patterns for reception and transmission from the strategically placed antennas 20. One antenna configuration utilizes two or more antennas held captive in the laptop housing 13 such that the radiation patterns of the antennas when combined together provide omni directional radiation and reception coverage in the azimuthal plane by using a power divider feed structure. Antennas 20 can be located at various points around the base of the laptop or on the lid so that they would be shielded from each other by the housing of the laptop.

As an example, if only two planar antennas that produce hemispherical radiation patterns are used, they could be located on opposite sides of the laptop that would essentially combine to provide a spherical coverage volume (uniform coverage in all directions). Given that the two antennas are separated by the width of the laptop, the coverage would not be a complete sphere, but many surface mounted antennas such as patch antennas provide coverage, which is shaped somewhat like a kidney or cardioid and would thus tend to fill the volume or space from one side of the laptop to the other. This approach would minimize the shadowing effect that the laptop has on a single antenna mounted elsewhere on the laptop or on a PCMCIA card within the laptop. FIG. 2 shows how the antennas might be integrated into the laptop plastics.

Exemplary micro-coaxial cables include feed structures, such as flex circuit material, wire cable, fiber optic cable, some sort of micro-coax cable, or other flexible conductive material that easily runs through the laptop interior to the antennas 20. In one configuration, the antenna feed structures could utilize a hybrid power divider 45 that provides electrical isolation between the antenna ports so that interference or impedance variations at one antenna 20a do not degrade the performance of the other antenna 20b. As such, this antenna structure design attempts to achieve good impedance matching to the feeding transmission line so as to maximize the available power for radiation. So if there is a mismatch, the wireless hardware will know because of potential connections or some other wireless port that the other antenna is unable to communicate with. The micro-coaxial cables 25 are independent lines coming in at a junction of the PCI card 30, but the impedance of one cable does not affect the impedance of the other cable. Thus the PCI card 30 has two separate lines as opposed to combining the two micro-coaxial cables 25 prior to connecting to the card 30. The mini-PCI card 30 is a portable, small implementation of essentially the PC card, but it's integrated or plugged directly onto the motherboard via PCI interface socket 15 that is located in the middle of the laptop. The mini-PCI interface 15 on laptop 10 allows for a new mini-PCI radio 30 to be inserted into the laptop, allowing for hardware upgrades. Although such upgrades would not be as easily performed as for those wireless systems located on a PCMCIA card, the risk of damage and lose of components are greatly reduced with the internal system. So the upgrade process is not something that a user would typically pull in and pull out on. The upgrade process is something akin to changing a video card in a desktop computer, with the notable exception that most users do not open up their laptop cases. Furthermore, the internal mini-PCI wireless system allows the laptop to be in continuous wireless contact without the risk of removal for want of a PCMCIA slot.

The integration of an antenna/radio solution within a laptop involves the ability to build the radio directly on the main board or even building the radio on a mini-PCI card both of which are considered "integrated" within the laptop case. Wireless radio 35 consists of components that enable wireless communication. For example, a Bluetooth radio chip comprises the bluetooth stack, link manager, RF baseband, and preamplifier set for a single antenna. Wireless radio 35 can comprise the components necessary for either a diversity or non-diversity radio. In a diversity situation power amplifier 40 and power divider 45 would be unnecessary as radio 35 would be able to send and receive signals to the individual antennas. In a non-diversity radio, the signal to be transmitted is sent to pre amplifier 40, which is programmably set according to the wireless specifications being used such that when the signal is divided, the signal will remain at the transmission limit of the standard. Power divider 45 theoretically divides the signal strength in half and transmits it equally along the micro-coaxial cables 25 to the antennas 20, which are integrated into the case of the laptop 10.

Radio 35 may either be a diversity or non-diversity radio. Diversity wireless systems or radios generally provide better performance than similar non-diversity systems. A diversity system is highly desirable because it effectively combats the most common problem with wireless equipment, namely, signal dropouts or multipath, when RF signals arrive at a location via different transmission paths, consisting of a combination of direct and reflected signals. Under these conditions, the output can be noisy, lost, or undecipherable. These problems generally occur in closed areas where metal objects are present, but may also exist in other environments. Diversity systems are able to avoid signal dropouts because they have two antennas and two receiver channels. Special circuits in the receiver select the signal from the antenna and receiver channel with the best signal. Because the chances that there will be a simultaneous signal dropout at both antennas are extremely low, diversity systems avoid signal dropouts. Diversity systems can also improve the useful operating range for wireless systems. This is because, even when there are no actual signal dropouts, the amount of signal available or strength of signal available at long ranges can be reduced. This can cause the wireless system to briefly lose the wireless signal well before the transmitter is truly out of range. With a diversity system, complete signal loss is unlikely and the operating range is extended. Two common types of diversity systems include a true diversity and a phasing diversity. In general, true diversity has a superior performance over phasing diversity. However, the true diversity equipment is also more expensive to manufacture, making the phasing diversity equipment acceptable in many situations.

While there are many inherent advantages of a diversity system, there are other aspects of wireless system design that can be important. For example, a high quality non-diversity wireless system will often perform better than a poorly designed or cheaply made diversity system. This is especially true in areas where signal interference is a serious problem. Additionally, diversity equipment is more expensive to purchase than similar non-diversity equipment. As such, the use of a non-diversity system should also be considered for situations where interference might be a serious problem and the cost of a diversity system of comparable quality is too expensive.

Exemplary diversity wireless protocols include the IEEE 802.11 RF wireless standards: 802.11 HR, 802.11b, and 802.11 @ 5 GHz standards. Other diversity wireless protocols include HiperLan, HiperLan II, and OpenAir wireless protocols. Exemplary non-diversity wireless protocols include the Bluetooth protocol, HomeRF protocol, and SWAP protocol. Although many of the non-diversity wireless protocols are developing a diversity operational mode so that they might enjoy the previously mentioned advantages of diversity radios, the present invention enables non-diversity protocols to enjoy the benefits of antenna diversity immediately while maintaining the interference related benefits of non-diversity.

Bluetooth, which is only one example of a non-diversity short-range wireless standard, is actually a combination of specialized computer chips and software. Bluetooth enables users to connect to a wide range of computing and telecommunications devices easily and simply, without the need to buy, carry, or connect cables. Bluetooth creates rapid ad hoc connections with other Bluetooth capable devices, thereby creating the possibility of automatic unconscious connections between digital devices. These connections can be used for a variety of purposes, for example to automatically update E-mail. Bluetooth virtually eliminates the need for additional or proprietary cabling to connect individual peripheral devices, because a single Bluetooth communication port can maintain at least 8 separate high-speed connections. The standard transfer rate for these high-speed Bluetooth connections is up to one megabyte per second, over 17 times as fast as a typical modem. Because Bluetooth can be used for a variety of purposes, it will also potentially replace multiple cable connections via a single radio link.

Figure 2A:
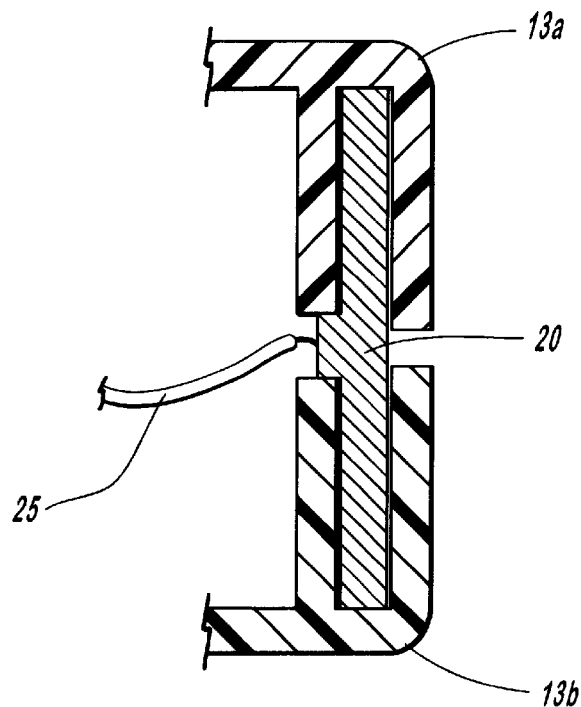
FIG. 2a is a cross sectional side view of an antenna captured within the housing of a digital device.
Figure 2B:
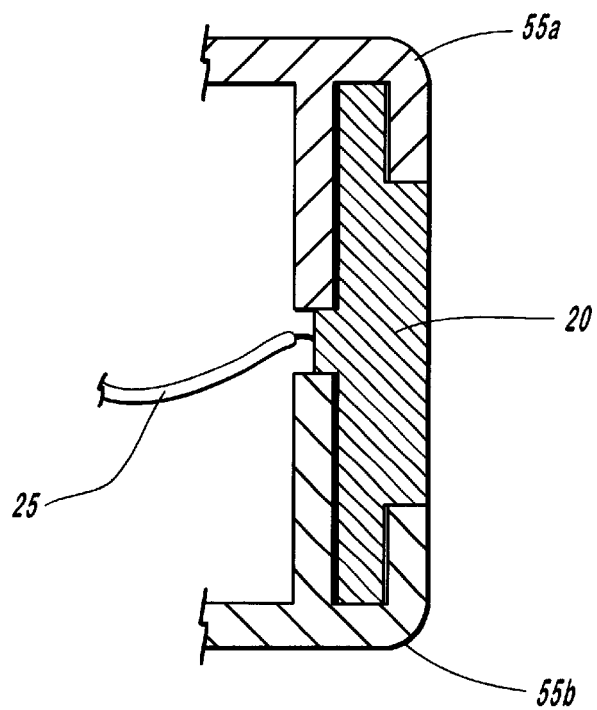
FIG. 2b is a cross sectional side view of an overmolded antenna held within the housing of a digital device.

FIG. 2a is a cross sectional side view of an antenna captured within the housing of a digital device. FIG. 2a is illustrative of how antenna 20 may be captured within the plastic radome of the housing 13 in the base unit 12 of the laptop computer 10. The housing for the base is split into two parts, a top portion 13a and a bottom portion 13b. These portions are mechanically fastened to each other upon assembly of the interior control portion of laptop computer 10. In utilizing the radome of housing 13, the antennas are held in an appropriate position and the transmission medium 25 will not be subject to damage. In some configurations, a gap between the top half of the laptop base or the upper section of housing 13a and the lower section 13b allows transmission and reception of radio signals. The integration of the antenna into the housing of the laptop computer allows for a reduction of some environmental and manufacturing constraints normally faced by integrated antenna designs. For example, the overall form factor of the laptop does not change, because the two halves of the laptop flow up and form the radome. If the laptop is using conductive plastic material, the antennas might have to be overmolded as depicted in FIG. 2b. The preferred position for antenna 20 is on the sides, between the upper section of housing 13a and the lower section 13b. Furthermore, the integrated solutions illustrated in FIGS. 2a and 2b are basically invisible to the user, yet they provide the necessary wireless directionality range all the way around the laptop.

Thus a laptop manufacturer can include the integrated antenna structure or leave it out of the laptop without changing the appearance and structure of the laptop. The sides are also a good location for the antenna 20, because there is not as much activity on the side of the laptop. In fact, the laptop industry is discussing moving away from PCMCIA based slots that are located on the sides of the laptop. As more devices are moving to USB and other things, it is foreseeable that plug adapters will be the interface of choice on laptops in the future rather than actual expansion card slots making the sides available for stronger and more sensitive antennas.

Although antenna shapes may be countless, there are several basic types of antennas. Wire antennas, aperture antennas, reflector antennas, and lens antennas are examples of the many engineering procedures that are used to collimate, focus, and effectively direct the electromagnetic energy radiated by the antennas. While the preferred embodiment of the present invention is the dual patch antenna configuration, other integrated antenna array configurations may be acceptable. Exemplary wire antennas include loop, straight wire, helix, or spiral antennas. Frequency independent antennas may also be designed and used in the present invention to provide equal performance over a broad frequency band.

Antenna 20 is preferably a patch antenna. Patch antennas are planar type antennas that transceive signals in a spherical coverage pattern but don't transceive signals directly behind them. A patch antenna can be a printed antenna formed on a PCB or a ceramic material. In most configurations patch antennas are usually square or rectangular. Presently, the most common use for patch antennas is with GPS devices in a variety of different applications, because the GPS device antennas mostly face upwards. Patch antennas have not necessarily been used in a directional coverage as proposed under the present invention.

Thus use of a planar type patch antenna is preferred, because they are very integratable into the laptop. Unfortunately, a single patch antenna does not have the kind of spherical coverage or 360° coverage desired for a laptop. This is particularly true with a Bluetooth type wireless application where one antenna is expected to give full coverage. Additionally, a battery run laptop wireless system has so little power to lose to begin with, the system should supply omnidirectional conductivity. As mentioned previously the environment of the laptop can block the radiation pattern of that low power signal. In fact, different brands of laptops create different operating environments for antenna systems. For example various electrical cages, used in the laptop for shielding, affect the proposed antenna system in dramatically different ways from one vendor to another. Making the placement of the patch antennas in the laptop important. While the patch antenna is not overly concerned with what happens behind it, it is important that the radiation pattern is not blocked by electrical components. Thus the edges of the laptop housing are generally and ideal location for the patch antennas.

Other exemplary antennas include fractal antennas, wire antennas, lens antennas, or other planar antenna structures. One such planar antenna is the inverted 'F' antenna, a hybrid of the patch antenna. The inverted F antenna is a cross-polarized antenna. Fractal antenna structures give a user similar wireless performance; the structure is designed predominantly according to the primary operating environment of the laptop computer. In one configuration, the antenna structure is composed of different types of antennas. For example, the sides may use one type of antenna, the front another type of antenna, and the back a third type of antenna.

Another acceptable configuration is a patch antenna that is circularly polarized. Circular polarization may give better coverage or may mitigate reflections that a user experience in the standard operating environment. For example, if one surrounding building is predominantly horizontally polarized and another surrounding building is predominantly vertically polarized the normal antenna will only receive one type of polarized signal. If the antenna is a vertically polarized antenna, then the antenna is not going to pick up horizontal polarization very well. In some wireless protocols, such as Bluetooth, that is the same as not working, because the signal is low power to begin with. So a user may choose one antenna, such as a circular polarized patch antenna, over another just because the antenna works better in different operating environments.

FIG. 2b is a cross sectional side view of an overmolded antenna held within the housing of a digital device. Certain laptop computers 10 contain EMI protection that does not allow the penetration of wireless signals nor can an integrated antenna located within the traditional radome transmit wireless signals out. For example, some laptop computers use conductive materials or fillers, such as exotic conductive plastic material, that interfere with fully integrated antenna arrays in the laptop cases or housing bodies. In these configurations, the laptop housing radome configuration would need to be altered as depicted in FIG. 2b to practice the present invention. The housing should be altered such that the upper portion of the housing would be designed as 55a and the lower portion as 55b exposing a larger portion of antenna 20. Antenna 20 is overmolded so as to be flush with the conductive housing 55. In this manner, the patch antenna could receive and transmit signals without the interference from the conductive cage or housing 55.

Figure 3:
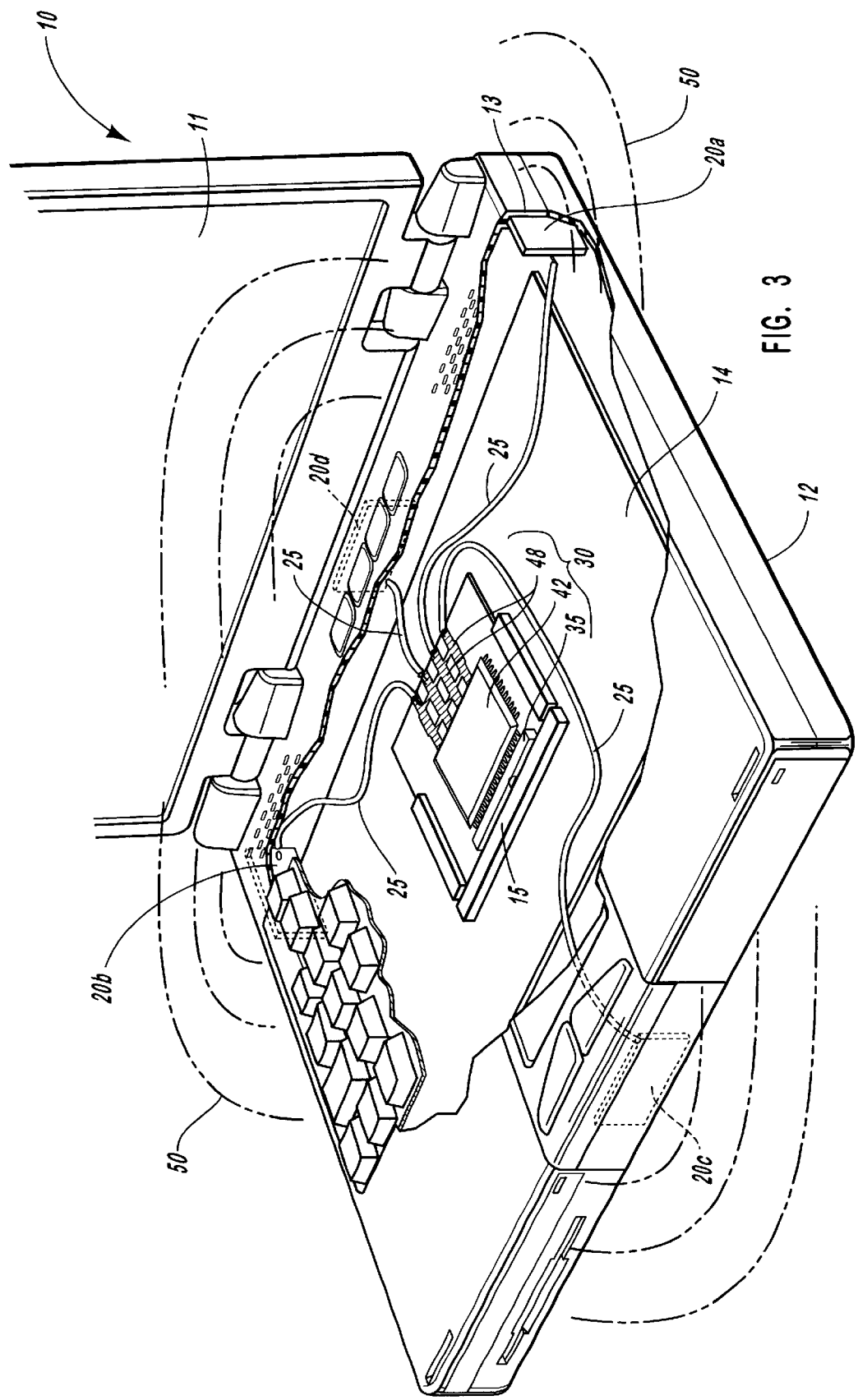
FIG. 3 is a perspective view of a laptop similar to FIG. 1, but showing four patch antennas for an improved radiation patterns.

FIG. 3 is a perspective view of a laptop similar to FIG. 1, but showing four patch antennas for an improved radiation patterns. FIG. 3 illustrates how a diversity antenna structure can be developed using at least four integrated antennas 20. The patch antennas produce a heart/kidney shaped lobe where the signal starts being unobstructed by the laptop, so as the signal gets further and further away from the laptop the radiation pattern becomes more complete. The front patch antenna 20c and a back patch antenna 20d produce a radiation pattern 50 that mitigates the small null area seen in FIG. 1, although the four-antenna configuration requires another power performance hit for the additional coverage.

In this configuration, wireless PCI card 30 contains wireless radio 35, but preamplifier 42 differs from the preamplifier 40 in FIG. 1, in that it specially configured according to the number of antennas attached to the power divider. For example, if there are four patch antennas, as illustrated, the power amplifier would amplify the signal from the non-diversity radio to compensate for an approximate 6 dB power loss associated with four patch antennas, so that following power divider 48, the power output would be within the desired specification levels. Power divider 48 is also configured differently from FIG. 1, so as to provide four isolated ports for each of the antennas 20.

This particular configuration may require additional circuitry within radio 35 in order to interpret the signals received from the various antennas. The four antennas would minimize the effect of blockage, but would allow the potential of having signals from more than one antenna, which might sum at an intended destination to form constructive interference in certain directions since antenna patterns would not be totally orthogonal with respect to each other. This configuration would also result in a power loss of 6 dB for four antennas instead of 3 dB for two antennas. However, the power loss would still be small compared to the transmission loss caused by blockage or multipath.

Diversity radios, such as those used in the IEEE 802.11 systems are already capable of determining which antenna is receiving the strongest RF signal, thus ensuring the best possible RF link performance. Non-diversity radios such as those currently used in the Bluetooth system would utilize the multiple antennas by feeding the radio from a power divider, as described in FIGS. 4 and 5, to produce omni directional radiation coverage. Furthermore, the antenna feed structure employs a power divider 48 that provides electrical isolation between the antenna ports so that interference or impedance variations at one antenna will not degrade the performance of the other antennas.

Figure 4A:
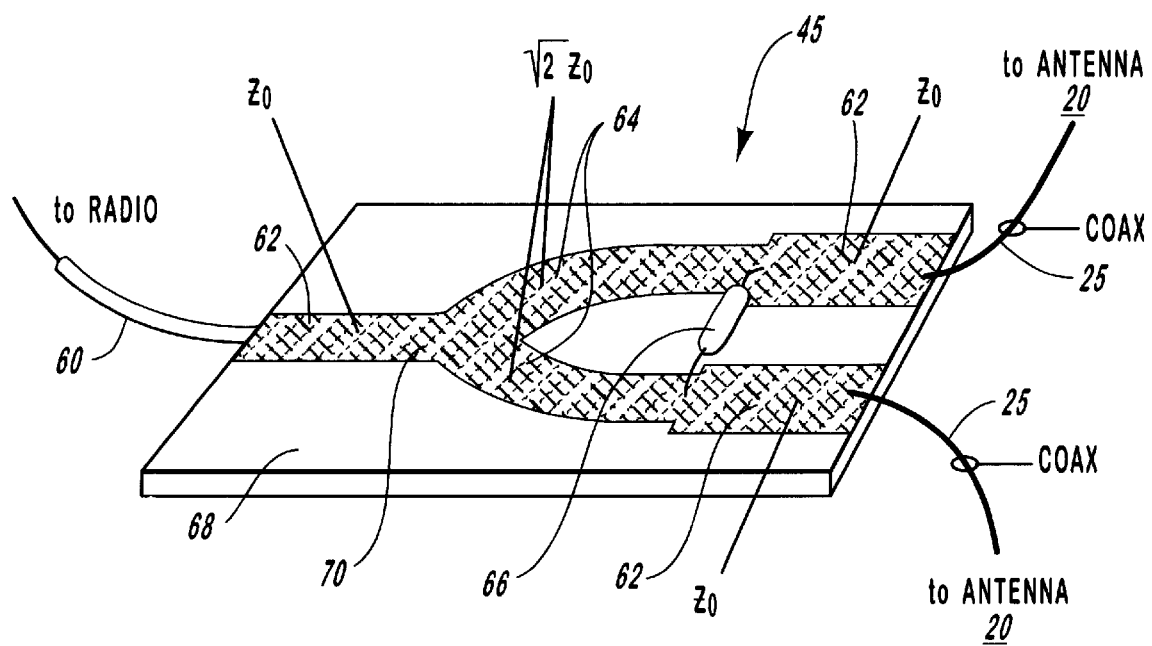
FIG. 4a is a power divider with port isolation (Wilkinson Power Divider)

FIG. 4a illustrates one configuration of a power divider, such as a Wilkinson power divider. Radio 35 transmits a signal often via a preamplifier 40, across a micro-coaxial cable or copper connection 60 to power divider 45. The Wilkinson power divider is advantageous for the antenna configuration, because it is lossless when the output ports are matched. The input impedance 62 is preferably the normalized characteristic impedance of the system and is illustrated as $Z_0$. Following the electrical division of the signal, each branch exhibits an impedance ratio of $\sqrt{2} \cdot Z_o$ due to the decreased area in each branch. Each branches being approximately λ/4 in length as illustrated. Resistor 66 is selected according to the ratio of two times the characteristic impedance and helps establish output impedance 62 of $Z_o$ on each branch of power divider 45. Placement of resistor 66 at the expanded area of each branch also ensures that the same potential exists at the input and output connection of the power divider for signals received or transmitted from antennas 20 via the micro-coaxial cables 25. Thus output impedance 62 is equivalent to the input impedance 62 of $Z_o$. The normalized characteristic impedance is most typically designed to match the characteristic impedance of the antenna. The power divider design attempts to achieve good impedance matching to the feeding transmission line so as to maximize the available power for radiation at the antenna by allowing for lossless power transfer to the antenna of the divided signal. One of the more advantageous features of this implementation is that power divider 45 may be easily implemented on a PCB board 68 with copper overlay 70. The power splitter/divider can then either be placed on the PCI card with the other radio components or kept separately on the main PCB board of the laptop computer as a built in antenna structure.

Unfortunately, this configuration results in a theoretical transmission performance hit of 3 dB, but if this results in really good coverage for non-diversity radio standards it is an acceptable loss associated with those antennas. When you split the signal, the signal loses approximately half of the available signal power. Half of the signal power is sent one direction, and the other half is sent to the other port.

One configuration overcomes the aforementioned performance hit by placing a bigger P/A (Power and Amplifier) on the PCI card between the radio and the power divider. The transmission signal would be amplified after the radio and sent to the divider such that upon signal division the signal is at the preferred signal strength. In the amplified configuration, the signal still loses half its power because of the signal split, but the original signal strength is 3 dB stronger than recommended. Making the divided signal, which is transmitted half out of one patch antenna and half of it out of the other patch antenna, within the specifications if power is a restriction. Because the signal levels coming out of either antenna is down 3 dB from the original signal entering the power divider.

Figure 4B:
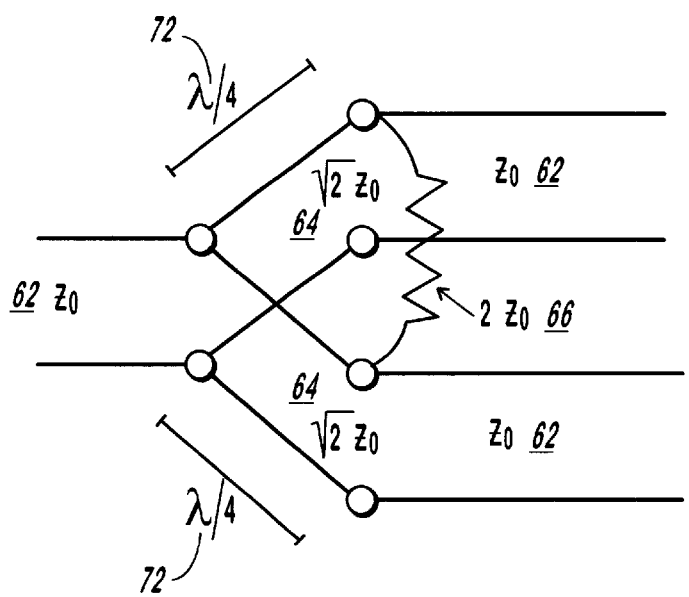
FIG. 4b is a schematic diagram of a power divider with port isolation.

FIG. 4b is a schematic diagram of the power divider illustrated in FIG. 4a. The schematic demonstrates the equal division of the input signal across a quarter wavelength 72. The schematic diagram also illustrates port isolation of the two output signals created from the input signal by the power divider. As such, the circuit produces two output signals with an approximate 3 dB drop in signal strength, where the output signals maintain the same characteristic impedance as the input and thereby allow for efficient power transfer to the antenna.

Figure 5A:
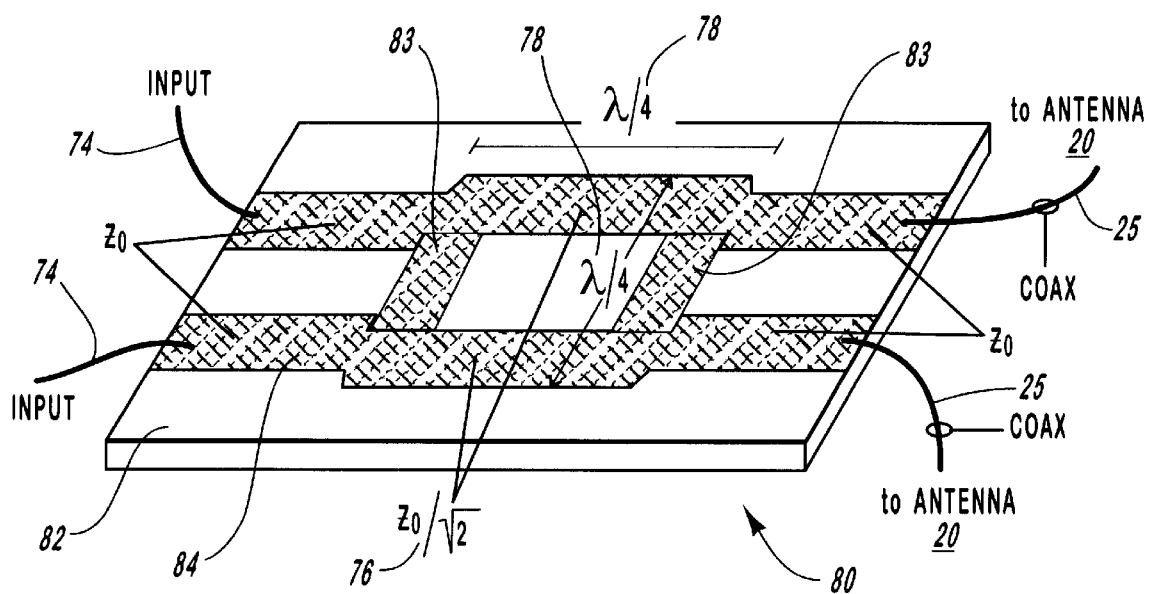
FIG. 5a is a branch-line quadrature hybrid power divider.

FIG. 5a is a branch-line quadrature hybrid power divider. Branch line quadrature hybrid power divider 80 can be substituted for power divider 45, illustrated in FIGS. 1 and 4. Branch line quadrature hybrid 80 has the advantage of an internal trace connection as illustrated by 83 with a high degree of symmetry. Any port on the quadrature hybrid power divider can be used as the input port, with the output ports always being on the opposite side of the junction as the input port. The port on the same side of the junction as the input port can be grounded in a non-diversity system. The isolated input signals 74 are taken into a divisional rectangle with two side channel impedances of $Zo/\sqrt{2}$ separating ports on opposite sides of the junction and two vertical channel impedances of $Z_o$ separating the ports on the same side of the junction. The channels, both vertical and side, of the divisional rectangle are made of conductive material and are equivalent to λ/4 in length as illustrated by 78.

Figure 5B:
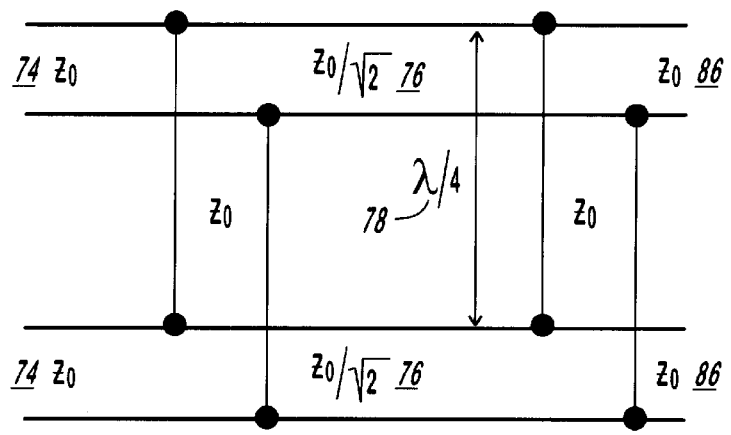
FIG. 5b is a schematic diagram of a branch-line quadrature hybrid power divider.

FIG. 5b is a schematic diagram of a branch-line quadrature hybrid power divider. As previously mentioned, any port on the quadrature hybrid power divider can be used as the input port, with the output ports always being on the opposite side of the junction as the input port. Each transmission line has a common ground return that is not illustrated. Upon the division of the signal via the divisional rectangle, output impedance 86 is equivalent to input impedance 74 as was illustrated previously. This particular power divider may also be placed on a PCB board or ceramic surface, and utilizing copper or other conductive material, the signal may be divided into equal portions.

Should a signal need to be divided, as illustrated in FIG. 3, into more than one division, a user may utilize the power dividers in succession or a power divider may be created with multiple branches according to the number of antennas connected to the system. If a staged method is used, amplifiers may be included following the power division and preliminary to the next power division, thereby enabling the signals to maintain a near maximum signal strength.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired to be secured by United States Letters Patent is:

1. A method of spherical coverage using an antenna array integrated into a housing of a digital device, the antenna array comprising at least two antennas separated by the width of the digital device, the method comprising:

positioning the antennas in the antenna array within a wall forming the housing at various points around the digital device such that together the antenna array generates omnidirectional coverage in the azimuthal plane;

if the antenna array is electrically coupled to a diversity radio, receiving the strongest RF signal from the antenna in the antenna array configured for strongest link performance at the desired RF signal and sending signals using the antenna array; and if the antenna array is electrically coupled to a non-diversity radio, transceiving signals with the antenna array via a power divider.

2. The method recited in claim 1, further comprising:

isolating the antenna ports of the antenna array using a power divider so that interference or impedance variation at one antenna will not degrade the performance of the other antennas.

3. A radio and antenna transceiver system electrically coupled to a digital device having a housing to enclose electronics, the transceiver system comprising:

a radio electrically coupled to the electronics on the digital device;

a power divider feed structure electrically coupled to the radio; and at least two antennas electrically coupled to the power divider, the antennas generating omnidirectional radiation coverage, and wherein the antennas are substantially disposed within a wall forming the housing of the digital device.

4. The radio and antenna transceiver system as recited in claim 3, wherein the radio is a diversity radio electrically selecting which one antenna from the at least two antennas is receiving the strongest RF signal to ensure the best available RF link performance.

5. The radio and antenna transceiver system as recited in claim 4, wherein the diversity radio is part of an IEEE 802.11 wireless system.

6. The radio and antenna transceiver system as recited in claim 3, further comprising:

a signal generated by the radio to be transmitted by the at least two antennas;

a power amplifier electrically coupled to the radio and the power divider feed structure, the power amplifier receiving the signal, increasing the signal strength, and transmitting the signal to the power divider feed structure; and wherein the power divider feed structure generates new signals for each antenna from the received signal such that the new signals are the same as the signal generated by the radio.

7. The radio and antenna transceiver system as recited in claim 3, wherein the radio is a non-diversity radio that obtains omnidirectional radiation coverage via the power divider feed structure between the at least two antennas and the non-diversity radio.

8. The radio and antenna transceiver system as recited in claim 7, wherein the non-diversity radio is a Bluetooth system radio.

9. The radio and antenna transceiver system as recited in claim 7, wherein the power divider feed structure results in a power loss of about 3 dB for two antennas.

10. The radio and antenna transceiver system as recited in claim 7, wherein the power divider feed structure results in a power loss of about 6 dB for four antennas.

11. The radio and antenna transceiver system as recited in claim 7, wherein the power divider feed structure is a Wilkinson power divider.

12. The radio and antenna transceiver system as recited in claim 7, wherein the power divider feed structure is a branch line quadrature hybrid.

13. An antenna and wireless transceiver system integrated within a laptop having a case and a radio disposed within the laptop case, the case having a base and a lid, the system comprising:

at least two antennas integrated within a wall forming the case of the laptop, the antennas generating spherical radiation coverage; and a power divider feed structure comprising a signal input interface coupled to the radio, isolated ports electrically connected to each antenna, a power divider, and a power amplifier.

14. The system as recited in claim 13, wherein the at least two antennas are planar antennas that transceive signals in a spherical coverage pattern but don't transceive signals directly behind them.

15. The system as recited in claim 14, wherein the planar antennas are patch antennas, where each patch antenna exhibits a cardioid radiation coverage pattern in the azimuthal plane such that the combination of the at least two patch antennas tend to fill the volume or space from one side of the laptop to the other.

16. The system as recited in claim 14, wherein the at least two planar antennas minimize the shadowing effect that the laptop has on a single antenna mounted elsewhere on the laptop or on a PCMCIA card.

17. The system as recited in claim 15, wherein the at least two patch antennas are captive in the laptop housing.

18. The system as recited in 17, wherein the at least two patch antennas are overmolded.

19. The system as recited in claim 15, wherein the at least two patch antennas are captured within a plastic radome of the case.

20. The system as recited in 17, wherein the at least two patch antennas are captured within a plastic radome of the case.

* * * * *